United States Patent
Hara et al.

(10) Patent No.: US 6,806,878 B2
(45) Date of Patent: Oct. 19, 2004

(54) GRAPHIC EDITING APPARATUS FOR ADDING OR DELETING CURVE TO/FROM GRAPHICS BY INTERACTIVE PROCESSING

(75) Inventors: Masanori Hara, Tokyo (JP); Kan Satou, Kanagawa (JP)

(73) Assignee: NEC Corporation, Tokyo (JP)

( * ) Notice: Subject to any disclaimer, the term of this patent is extended or adjusted under 35 U.S.C. 154(b) by 244 days.

(21) Appl. No.: 09/942,993

(22) Filed: Aug. 31, 2001

(65) Prior Publication Data

US 2002/0027554 A1 Mar. 7, 2002

(30) Foreign Application Priority Data

Sep. 1, 2000 (JP) .................................... 2000-266127

(51) Int. Cl.[7] .............................................. G06T 15/00
(52) U.S. Cl. ....................................................... 345/442
(58) Field of Search ........................................ 345/442

(56) References Cited

U.S. PATENT DOCUMENTS 5,940,083 A * 8/1999 Broekhuijsen .............. 345/442
6,441,823 B1 * 8/2002 Ananya ...................... 345/442
6,535,213 B1 * 3/2003 Ogino et al. ................ 345/442
2001/0000963 A1 * 5/2001 Deguchi ..................... 345/420

FOREIGN PATENT DOCUMENTS

| JP | 62-128367 | 6/1987 |
| JP | 10-11598 | 1/1998 |
| JP | 11-328431 | 11/1999 |

* cited by examiner

Primary Examiner—Michael Razavi
Assistant Examiner—Motilewa Good-Johnson
(74) Attorney, Agent, or Firm—Sughrue Mion, PLLC

(57) ABSTRACT

A graphics to be edited is displayed on a display device and an operator controls a mouse to input coordinate data of two or more points. It is determined whether the curve included in the graphics should be deleted or a new curve should be added, depending on whether inputted coordinate data of two or more points conforms to points on any one of curves included in the graphics to be edited. When it is determined that the curve should be deleted, a deleting curve is generated, and when it is determined that the new curve should be added, an adding curve is generated, and the resultant is superimposed on the editing graphics and is displayed on the display device. When the operator inputs a defined operation, the graphics is corrected based on the deleting curve or the adding curve.

19 Claims, 7 Drawing Sheets

GRAPHIC EDITING APPARATUS FOR ADDING OR DELETING CURVE TO/FROM GRAPHICS BY INTERACTIVE PROCESSING

BACKGROUND OF THE INVENTION

1. Field of the Invention

The present invention relates to a graphic editing apparatus for editing two-dimensional graphics including at least one curve and its method.

2. Description of the Related Art

An automatic fingerprint identifying system (AFIS) scans an image of a fingerprint image using a scanning, extracts curves, which are referred to as core lines corresponding to a rising portion of the scanned fingerprint (see FIG. 6), and performs identification of fingerprint based on information of edge points and intersecting points of this core line. Processing for extracting the core line from the image of fingerprint is automatically performed by AFIS in the normal case. However, among the images of fingerprints collected at the scene of a crime, there are many images from which the core line cannot be extracted because of the low quality of image. In such a case, a person operates a computer by interactive processing and adds/deletes the core line.

In connection with the operations for correcting the core line, an operation for newly adding a core line of a portion where a fingerprint is unclear and an operation for deleting curves other than the fingerprint, which are extracted later, are often carried out. At the portion where the adjacent core lines are in delicately contact with each other, the core line cannot be automatically extracted in many cases. Processing for correcting a core line having an intersecting point 701 illustrated in FIG. 7 to a core line having an edge point 801 illustrated in FIG. 8; conversely, processing for correcting the core line having the edge point 801 illustrated in FIG. 8 to the core line having the intersecting point 701 illustrated in FIG. 7 are performed. Namely, the core line correcting operation is an operation for editing the image of graphics, and a graphic editing apparatus using interactive processing is resultantly used.

In the conventional graphic editing apparatus for performing such a core line correction, an operator controls an operation specification using an operation mode specifying button, a menu, and a keyboard so as to specify either processing for adding a curve as a core line or processing for deleting a curve line. However, in the conventional graphic editing apparatus, as the need for repeating the addition/deletion of curve frequently comes about, the operator must also frequently control the operation specification and this causes a problem in which the usability is poor.

For instance, in the case where the operation mode is changed by the menu selection, three operations, which include a mouse click for opening a menu, a mouse movement for selecting an item, and a mouse click for executing the selected item, are required. In the case where the operation mode is changed by the operation mode specifying button, the number of clicks of the mouse button may be one, but the mouse must be moved to the operation mode specifying button from a graphic area and returned to the graphic area again. In the case where the operation mode is changed by the keyboard, there are problems in which it takes much time for the operator to become accustom to perform the keyboard operation and the use of keyboard is limited in the other purpose.

A conventional method for deleting the graphics during editing by the graphic editing apparatus includes a method for specifying a rectangular area to delete the graphics in the area, a method for moving a brush by the mouse operation to delete the graphics, a method for selecting a specific curve to delete the curve, and the like. However, in the case where the curves are densely formed as the image illustrated in FIG. 6, there is a problem in which the operation for deleting the specific curve becomes troublesome even if any method is selected from among these methods.

As a document that discloses the technique close to such a graphic editing apparatus, there are Unexamined Japanese Patent Application KOKAI Publication No. S62-128367, Unexamined Japanese Patent Application KOKAI Publications Nos. H10-11598 and H11-328431 and the like. However, there is a problem in which the technique disclosed in any of these publications is not suitable for application to the correction of the core line extracted from the image of fingerprint set forth below.

For example, the technique disclosed in Unexamined Japanese Patent Application KOKAI Publication No. S62-128367 is one that corrects a passing point of a spline curve to deform the curve, and this cannot be applied to processing for the curve shown by a dot pattern as in the core line.

The technique disclosed in Unexamined Japanese Patent Application KOKAI Publication No. H10-11598 is one that inputs a new line with respect to the line already inputted to automatically determine as to which of these corrections, including a mid-segment correction, an extension correction and a vertex movement correct, should be performed to respect to the line already inputted from coordinates of both lines. However, in the case where an operation that deletes a part of the inputted line to be divided into two lines or a adds a new line is carried out, the operation mode must be changed by the operator.

The technique disclosed in Unexamined Japanese Patent Application KOKAI Publication No. H11-328431 is one that inputs a sketch curve to search a curve in the graphics close to the sketch curve and deforms the searched curved in the graphics is made close to the sketch curve. However, the same problem as that of the technique disclosed in Unexamined Japanese Patent Application KOKAI Publication No. H10-11598 exists in this technique.

As mentioned above, the graphic editing apparatus, which is suitable for processing for correcting the curve such as a core line extracted from the fingerprint, has not been known well in convention. Hence, there has been desired a graphic editing apparatus that can efficiently perform an operation that deletes a curve included in graphics to be edited or adds a new curve to the graphics.

SUMMARY OF THE INVENTION

An object of the present invention is to efficiently perform the operations in which a curve is added to a two-dimensional graphics or a curve is deleted from the graphics.

In order to attain the above object, according to a first aspect of the present invention, there is provided a graphic editing apparatus comprising a program memory for storing a program; a data memory for storing data; a display device for displaying an image; a coordinate input device for inputting two-dimensional coordinate data; and a processor, which is connected to the program memory, the data memory, the display device and the coordinate input device, for executing a predetermined calculation in accordance with the program stored in the program memory and for controlling the data memory, the display device and the coordinate input device, wherein the graphic editing apparatus edits a two-dimensional graphics including at least one curve in accordance with an operator's operation of the coordinate input device, the data memory including an area where two-dimensional data of the graphics to be edited is stored; and an area where coordinate data inputted from the coordinate input device is stored, the program including a graphic storing step of storing data of the graphics in the data memory, a graphic displaying step of displaying an image of the graphics stored in the data memory on the display device; a coordinate inputting step of inputting, from the coordinate input device, coordinate data of a plurality of points in a two-dimensional space where the graphics exists in accordance with the displayed graphics to be edited; a coordinate storing step of storing the inputted coordinate data of the plurality of points in the data memory; an addition/deletion determining step of determining whether a new curve should be added to the graphics or a curve included in the graphic should be deleted based on the coordinate data of the plurality of points and data of the graphics in the data memory; and a graphic editing step of performing either processing for adding a new curve to two-dimensional data of the graphics stored in the data memory or processing for deleting a curve from two-dimensional data of the graphics based on a determination result in the addition/deletion determining step.

In the aforementioned graphic editing apparatus, a person, who edits the graphics, has only to input coordinate data from the coordinate inputting device in order to add the curve to the editing graphics and to delete the curve from the graphics. Namely, in the case of performing the addition of curve and the deletion, there is no need to perform such an operation that changes the operation mode. For this reason, according to the graphic editing apparatus of the present invention, it is possible to edit the graphics efficiently.

In the graphic editing apparatus according to the first aspect, it is preferable that the coordinate input device can input coordinate data by an arbitrary method among a plurality of kinds of input methods. In this case, the program may further include a input determining step of determining whether the input method of coordinate data in the coordinate inputting step is a specific method indicating that no coordinate data of other points is to be inputted. The graphic editing step may correct two-dimensional data of the graphics stored in the data memory two-dimensional data of the graphics where the curve is added or deleted when the input method is determined as the specific method in the input determining step.

Two-dimensional data of the graphics is corrected only after coordinate data is inputted from the coordinate inputting device by the specific method. For this reason, the person, who edits the graphics, can correct the graphics after confirming that coordinate data is inputted from the coordinate inputting means as intended In the addition/deletion determining step, the addition/deletion determining step may determine whether a new curve should be added to the graphics or a curve included in the graphics should be deleted, every time when coordinate data is inputted in the coordinate inputting step. In this case, the graphic editing step may include a curve adding step of generating an adding curve corresponding to coordinate data of the plurality of points stored in the data memory when it is determined that the input method is not the specific method is determined and it is determined that the new curve should be added in the addition/deletion determining step; a curve deleting step of generating a deleting curve corresponding to coordinate data of the plurality of points stored in the data memory when it is determined the input method is not the specific method in the input determining step and it is determined that the curve should be deleted in the addition/deletion determining step; and a graphic correcting step of correcting two-dimensional data of the graphics stored in the data memory to two-dimensional data where the curve is added or deleted based on the addition curve or the deleting curve when it is determined that the input method is the specific method in the input determining step. The graphic displaying step may superimpose the adding curve or the deleting curve on the image of the graphics and display the resultant on the display device.

Here, it is preferable that the image of graphics, the adding curve and the deleting should be displayed on the display device in modes different from one another.

The adding curve or the deleting curve is thus generated and is superimposed on the image of the editing graphics, and is displayed. This makes it possible for the person, who edits the graphics, to confirm the corrected graphics before coordinate data is inputted by the specific method to correct the graphics. Moreover, the display modes of the editing graphics, the adding curve and the deleting are made different one another, making it possible for the person, who edits the graphics, to confirm as to which of the addition of curve and the deletion of curve is determined in the addition/deletion determining step.

In the graphic editing apparatus according to the first aspect, when a plurality of curves being traceable from the starting point to the ending point of coordinate data stored in the data memory is included in the graphics, the addition/deletion determining step may determine the shortest curve of all as a curve to be deleted.

Such a state is generated; for example, when coordinate data of two points on the loop curve that form a closed area in such a case, the shortest curve is determined as a curve to be deleted to make it possible to edit the graphics more efficiently.

In the graphic editing apparatus according to the first aspect, the program may further include a step of determining whether a point intersecting other curve is included in the deleting curve when it is determined that the curve should be deleted in the addition/deletion determining step. In this case, the graphic editing step may perform processing for deleting a curve from the two-dimensional data of the graphics after excluding the intersecting point from a deleting object.

The point intersecting the other curve is excluded from the deleting object, so that the other curve is not divided in two-dimensional data of the corrected graphics.

In the graphic editing apparatus according to the first aspect, when there is a curve, which is traceable in accordance with coordinate data stored in the data memory and which has only non-curve points, included in the graphics, the addition/deletion determining step may determine a deletion of the curve having only non-curve points. In this case, the graphic editing step may perform processing for deleting the curve having only the non-curve points.

In this case, for example, even if the non-curve points are generated in the editing graphics by adding the new curve, the corresponding curve point can be easily eliminated to make it possible to edit the graphics more efficiently.

In the graphic editing apparatus according to the first aspect, the graphic editing step may further include the step of thinning each curve included in the graphics subjected to the curve addition when processing for adding the curve is performed.

In this case, for example, the non-curve points generated in the editing graphics by adding the new curve can be automatically eliminated to make it possible to edit the graphics more efficiently.

In the graphic editing apparatus according to the first aspect, when the curve that should be added in accordance with coordinate data stored in the data memory and the curve already included in the graphics form a loop curve with a length being less than a predetermined length, the graphic editing step may perform processing for excluding the loop curve to add the curve to two-dimensional data of the graphics.

In this case, for example, the short loop curve generated in the editing graphics by adding the new curve can be automatically eliminated to make it possible to edit the graphics more efficiently.

In the graphic editing apparatus according to the first aspect, the program may further include a coordinate searching step of searching coordinate data of points on the curve included in the graphics close to coordinate data of points inputted in the coordinate inputting step. In this case, the coordinate storing step may store coordinate data of points searched in the coordinate searching step in the data memory in place of coordinate data of points inputted in the coordinate inputting step.

In this case, even if the coordinates are not correctly inputted from the coordinate inputting device, the person, who edits the graphics, can delete a desired curve from the editing graphics, whereby making it possible to edit the graphics more efficiently.

In order to attain the above object, according to the second aspect of the present invention, there can be provided a graphic editing apparatus for editing a two-dimensional graphics including at least one curve in accordance with an operation done by an operator, the graphic editing apparatus comprising graphic storing means for storing two-dimensional data of the graphics to be edited; graphic displaying means for displaying an image of the graphics stored in the graphic storing means; coordinate inputting means for inputting coordinate data of a plurality of points in a two-dimensional space where the graphics exists in accordance with the image displayed by the graphic displaying means; coordinate storing means for storing coordinate data of the plurality of points inputted by the coordinate inputting means; addition/deletion determining means for determining whether a new curve should be added to the graphics or a curve included in the graphics should be deleted based on coordinate data of the plurality of points stored in the coordinate storing means and data of the graphics stored ins the graphic storing means;

graphic editing means for performing either processing for adding a new curve to two-dimensional data of the graphics stored in the data memory or processing for deleting a curve from two-dimensional data of the graphics based on the determination result of the addition/deletion determining means.

In the graphic editing apparatus according to the second aspect, it is preferable that the coordinate inputting means may perform either an undefined input indicating that coordinate data of other points is to be inputted or a defined input indicating that no coordinate data of other points is to be inputted.

In this case, the graphic editing means may correct two-dimensional data of the graphics stored in the graphic storing means to two-dimensional data of the graphics where the curve is added or deleted when the defined input is sent from the coordinate inputting means.

In this case, the addition/deletion determining means may determine whether a new curve should be added to the graphics or a curve included in the graphics should be deleted every time when coordinate data is inputted from the coordinate inputting means. The graphic editing means may include adding curve generating means for generating an adding curve corresponding to coordinate data of the plurality of points stored in the coordinate storing means when the defined input is sent from the coordinate inputting means and the addition/deletion determining means determines that a new curve should be added; deleting curve generating means for generating a deleting curve corresponding to coordinate data of the plurality of points stored in the coordinate storing means when the undefined input is sent from the coordinate inputting means and the addition/deletion determining means determines that the curve should be deleted; and graphic correcting means for correcting two-dimensional data of the graphics stored in the graphic storing means to two-dimensional data where the curve is added or deleted based on the addition curve or the deleting curve when the defined input is sent from the coordinate inputting means.

The graphic editing apparatus according to the second aspect may further comprise coordinate searching means for searching coordinate data of points on the curve included in the graphics close to coordinate data of points inputted from the coordinate inputting means. In this case, the coordinate storing means stores coordinate data of points searched in the coordinate searching means in place of coordinate data of points inputted by the coordinate inputting means.

In order to attain the above, according to the third aspect of the present invention, there can be provided a graphic editing method for editing a two-dimensional graphics including at least curve in accordance with an operation done by an operator, the graphic editing method comprising inputting coordinate data of a plurality of points in a two-dimensional space where the graphics exists; determining whether a new curve should be added to the graphics or the curve included in the graphics should be deleted with reference to the position of the inputted coordinate data of the plurality of points on the graphics; and performing either processing for adding a new curve to the graphics or processing for deleting a curve therefrom based on the determination result.

In order to attain the above, according to the fourth aspect of the present invention, there can be provided a computer-readable recording medium having a program for editing a two-dimensional graphics including at least one curve in accordance with an operation done by an operator recorded thereon, the program causing a computer to execute steps of storing two-dimensional data of the graphics to be edited in a memory; displaying an image of the graphics stored in the memory on a display device; inputting coordinate data of a plurality of points in a two-dimensional space where the graphics exists from an input device in accordance with the displayed image of graphics to be edited; determining whether a new curve should be added to the graphics or a curve included in the graphics should be deleted based on coordinate data of the plurality of points and data of the graphics stored in the memory; performing either processing for adding a new curve to two-dimensional data of the graphics stored in the memory or processing for deleting a curve from two-dimensional data of the graphics based on a determination result of the determining step.

In order to attain the above, according to the fifth aspect of the present invention, there can be provided a carrier wave having a data signal of a program for editing a two-dimensional graphics including at least one curve in accordance with an operation done by an operator superimposed thereon, the program causing a computer that receives the carrier wave to execute steps of storing two dimensional data of the graphics to be edited in a memory; displaying an image of the graphics stored in the memory on a display device; inputting coordinate data of a plurality of points in a two-dimensional space where the graphics exists from an input device in accordance with the displayed image of graphics to be edited; determining whether a new curve should be added to the graphics or a curve included in the graphics should be deleted based on coordinate data of the plurality of points and data of the graphics stored in the memory; performing either processing for adding a new curve to two-dimensional data of the graphics stored in the memory or processing for deleting a curve from two-dimensional data of the graphics based on a determination result of the determining step.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A preferred embodiment of the present invention will be specifically explained with reference to the drawings accompanying herewith.

Figure 1:
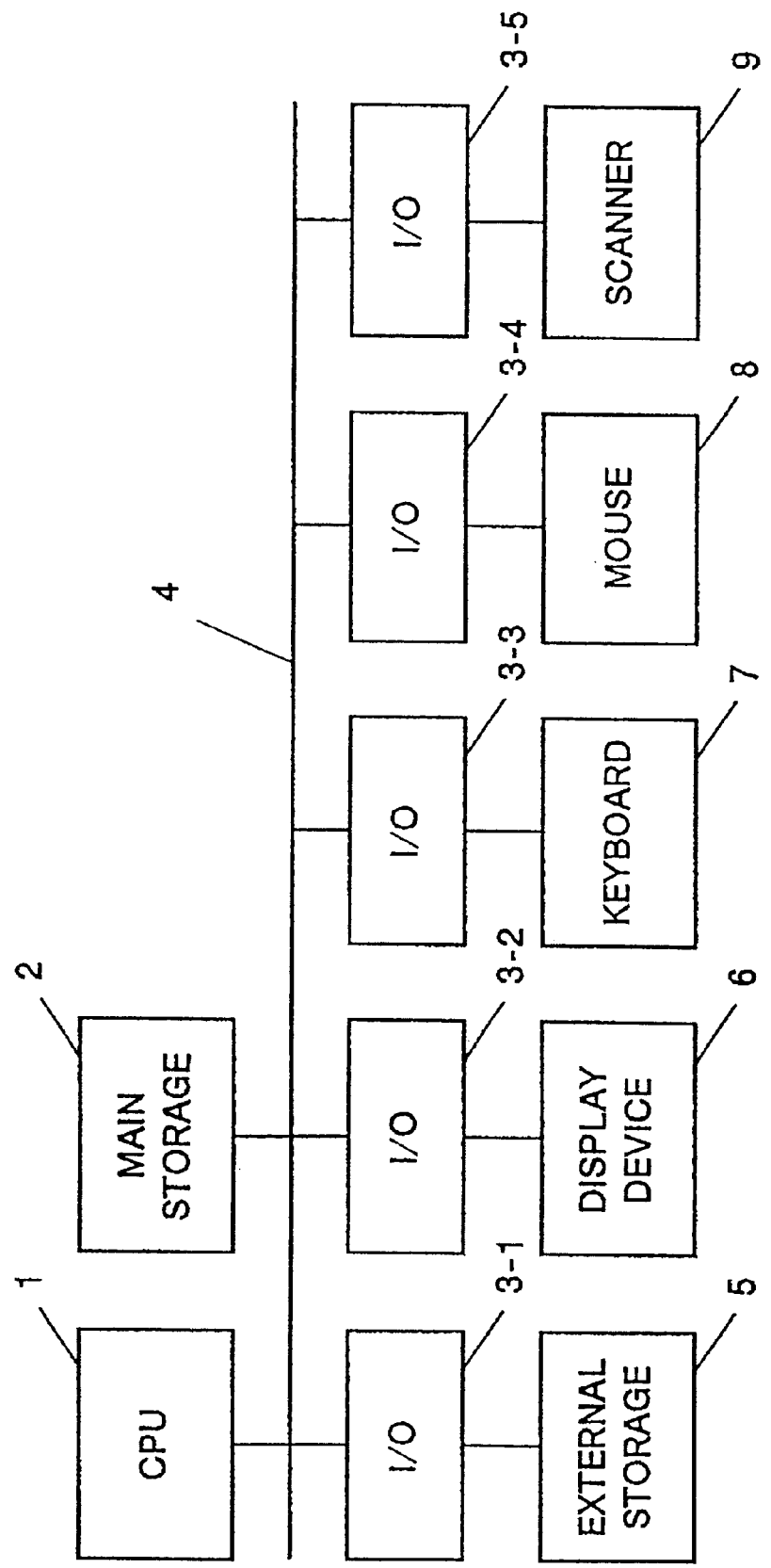
FIG. 1 is a block diagram showing the configuration of a computer system serving as a platform of a graphic editing apparatus according to an embodiment of the present invention.

In the graphic editing apparatus of this embodiment, a general-purpose computer such as a personal computer and an engineering workstation is implemented as a platform. FIG. 1 is a block diagram showing the configuration of this computer system. As illustrated in this figure, this computer system includes a CPU (Central Processing Unit) 1, main storage 2, and a plurality of input/output controllers (I/O) 3 (3-1, 3-2 . . . ). They are interconnected via a system bus 4. As peripheral devices to be connected to the I/Os 3, external storage 5, a display device 6, a keyboard 7, a mouse 8, and a scanner 9 are included.

CPU 1 includes cache memory. The main storage 2 provides a physical address space of this computer system, and the external storage 5 provides a logical address space. In the explanation set below, in the case where "memory" is simply used, it is assumed that this includes all of cache memory, main storage 2 and external storage 5.

CPU 1 executes a program stored in a program area of the memory to perform calculation processing necessary for editing the graphics to be described later and to control each section of this computer system. The programs stored in the memory include an operating system, driver programs for the peripheral devices, and an application program (hereinafter referred to as a graphic editing program) for editing graphics to be described later. The graphic editing program uses the function of operating system and that of the driver programs. The memory has a data area other than the program area The I/O controller 3 controls the connected peripheral devices according to the instruction from the CPU 1. The display device 6 is composed of CRT (cathode ray tube), a liquid crystal display device and the like, and displays graphics to be edited. The keyboard 7 is an input device for inputting text data and a predetermined instruction assigned to the key. The mouse 8 is a pointing device for inputting a coordinate position in accordance with a mouse cursor displayed on the display device 6, and two-button mouse is used herein. The scanner 9 scans an image of graphics to be edited, for example, an image of fingerprint.

Figure 2:
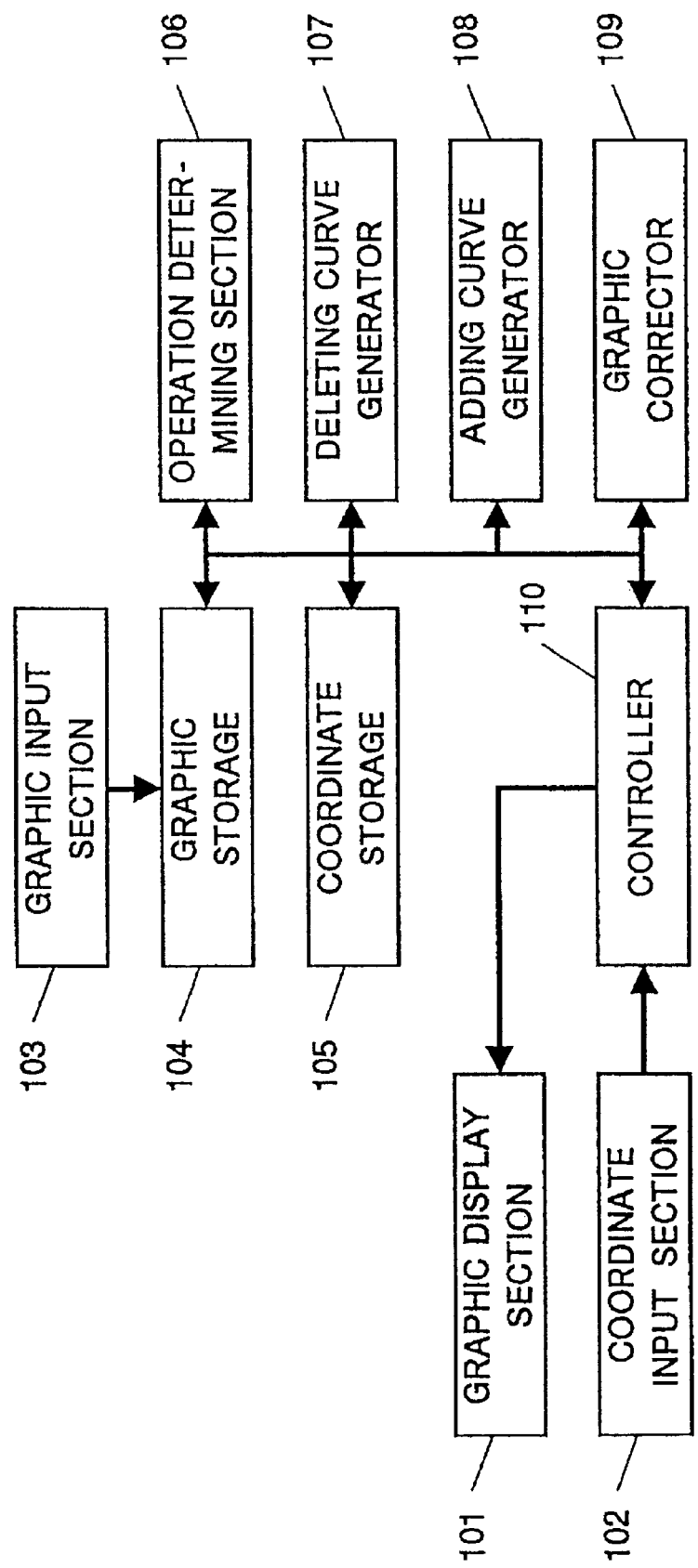
FIG. 2 is a function block diagram of the graphic editing apparatus according to the embodiment of the present invention.

CPU 1 executes the graphic editing program, so that the computer system of FIG. 1 functions as a graphic editing apparatus. FIG. 2 is a function block diagram of the graphic editing apparatus of this embodiment. This graphic editing apparatus comprises a graphic display section 101, a coordinate input section 102, a graphic input section 103, graphic storage 104, coordinate storage 105, an operation determining section 106, a deleting curve generator 107, an adding curve generator 108, a graphic corrector 109, and a controller 110.

The graphic display section 101 is implemented mainly by the display device 6 and its driver program and displays an editing graphics stored in the graphic storage 104; and shows it to an operator. The graphic display section 101 displays the editing graphics on a white background image in black and further superimposes a deleting curve (to be described later) thereon and displays it in red, and an adding curve (to be described later) in green. The graphic display section 101 also displays the mouse cursor that follows the movement of the mouse 8.

The coordinate input section 102 is implemented mainly by the mouse 8 and its driver program and inputs coordinate data corresponding to the adding or deleting curve in response to the operation from the operator. The coordinate input section 102 inputs information indicating the facts in which the mouse is moved, or a left button of the mouse 8 is single-clicked or double-clicked and a right button is clicked.

The graphic input section 103 is implemented mainly by the scanner 9 and its driver program and inputs two-dimensional image data of the graphics scanned by the scanner 9, and stores it to the graphic storage 104.

The graphic storage 104 is implemented when a predetermined area is reserved in the memory by the graphic editing program The graphic storage 104 stores image data (in primary, image data of the graphics inputted from the graphic input section 103) of the editing graphics with a binary pattern every coordinate. In each coordinate g (x, y)

of image data stored in the graphic storage 104, when there is a curve included in the graphics, "1" is stored therein and when there is no curve, "0" is stored therein. Herein, since the graphics to be edited is the fingerprint, lines included in the corresponding graphics are substantially all curves. Even in the case where a straight line is included in the graphics, the straight line is included as a concept of curve. The curves include a loop curve that forms a closed area.

The coordinate storage 105 is implemented when an area is dynamically reserved in the memory by the graphic editing program. The coordinate storage 105 stores coordinate data g (px(i), py(i)) of the point inputted from the coordinate input section 102 when the left button of the mouse 8 is single-clicked or double-clicked. The coordinate data first stored in the coordinate storage 105 is a starting point of the curve specified by the operator, and the coordinate data last stored therein is an ending point. The coordinate storage 105 temporarily stores the coordinate of the point of a moving destination when the mouse 8 only moves. However, unless the left button is single-clicked or double-clicked at this point, coordinate data is immediately deleted.

The operation determining section 106 is implemented when CPU 1 executes an operation determination routine of the graphic editing program. The operation determining section 106 determines whether the curve specified by the operator is the curve, which should be deleted from the curves already contained in the graphics, or the curve, which should be newly added to the graphics.

For example, when the relationship of coordinate data g (px(i), py(i))=1 is established with respect to all points stored in the coordinate storage 105, the operation determining section 106 determines whether there is a curve, which passes through each point and which is traceable from the stating point to the ending point, in the graphics stored in the graphic storage 104. When the operation determining section 106 determines that there is a traceable curve therein, the operation determining section 106 determines that the curve specified by the operator should be deleted so that the curve deletion operation is performed. When the operation determining section 106 determines that there is no traceable curve therein, the operation determining section 106 determines that the curve specified by the operator should be newly added so that the curve addition operation is performed.

The trace of curve is one processing for searching a point on the untraced graphics from eight points adjacent to a notice point to be moved to the notice point successively. When the trace arrives at the edge point of curve (point whose tracing direction is one way), the intersecting point (point whose tracing direction is three or more ways) or a non-curve point (trace impossible point such as a point having an area) or the trace returns to the starting point of coordinate (loop curve that forms a closed path), the trace of the curve is ended.

The deleting curve generator 107 is implemented when CPU 1 executes a deleting curve generation routine of the graphic editing program. When the operation determining section 106 determines the deletion of curve, the deleting curve generator 107 generates a deleting curve corresponding to the curve specified by the operator. Data of the generated deleting curve is temporarily stored in a given area of the memory. Data of the generated deleting curve can be regarded as data of the curve that conforms to the curve specified by the operator even if the curve is a curve that is included in the graphics stored in the graphic storage 104. In the case where the curve of the graphics that conforms to the curve specified by the operator intersects the other curve, the deleting curve generator 107, of course, excludes the corresponding intersecting point to generate the deleting curve.

The adding curve generator 108 is implemented when CPU 1 executes an adding curve generation routine of the graphic editing program. When the operation determining section 106 determines the addition of curve, the adding curve generator 108 generates an adding curve corresponding to the curve specified by the operator. Data of the generated adding curve is temporarily stored in a given area of the memory. Data of the generated adding curve may be, for example, coordinate data of a plurality of points stored in the coordinate storage 105 and data of spline curve passing through the plurality of these points.

The graphic corrector 109 is implemented when CPU 1 executes a graphic correction routine of the graphic editing program. When the left button of mouse 8 is double-clicked, the graphic corrector 109 performs processing for correcting image data of the graphics stored in the graphic storage 104 based on the deleting curve or the adding curve. More specifically, in the case where the operation determining section 106 determines the deletion of curve at the time when the left button of mouse 8 is double-clicked, the graphic corrector 109 deletes the curve of the graphics corresponding to the deleting curve (data corresponding to the point on the deleting curve stored in the graphic storage 104 is set to "0"). In the case where the operation determining section 106 determines the addition of curve at the time when the left button of mouse 8 is double-clicked, the graphic corrector 109 adds the curve of the graphics corresponding to the adding curve to the graphics (data corresponding to the point on the adding curve stored in the graphic storage 104 is set to "1").

The controller 110 is implemented when CPU 1 executes a main routine of the graphic editing program. The controller 110 controls by which of graphic display section 101, coordinate input section 102, graphic input section 103, graphic storage 104, coordinate storage 105, operation determining section 106, deleting curve generator 107, adding curve generator 108, graphic corrector 109 processing should be performed.

Figure 3:
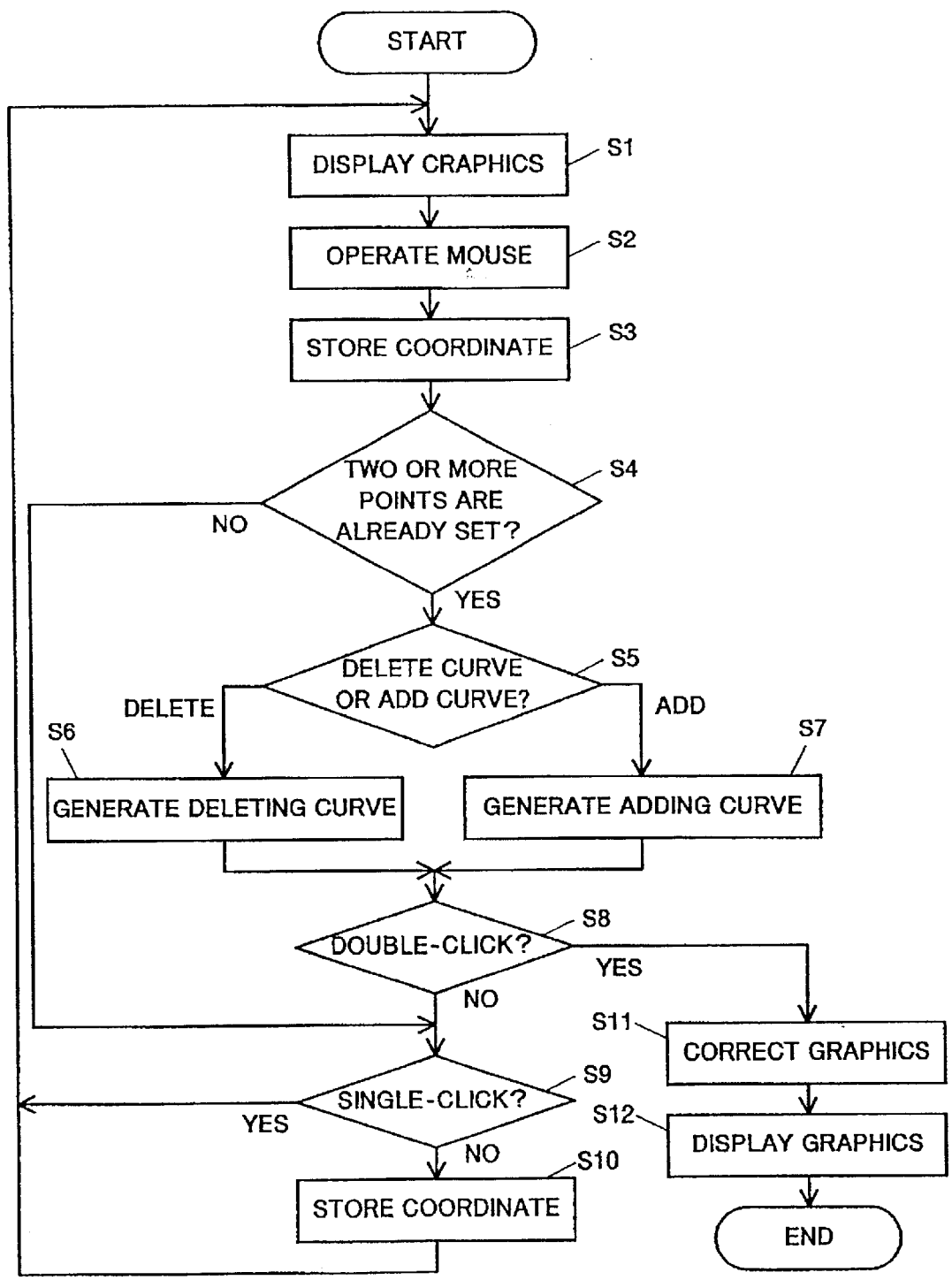
FIG. 3 is a flowchart illustrating processing by the graphic editing apparatus according to the embodiment of the present invention.

The following explains the operation of the graphic editing apparatus according to this embodiment. FIG. 3 is a flowchart illustrating processing by the graphic editing apparatus according to the embodiment of the present invention. The explanation set forth below is based on the function block diagram of FIG. 2. It is assumed that the graphics to be edited is inputted from the graphic inputting section 103 and stored in the graphic storage 104 before processing of the flowchart of FIG. 3 is executed.

First, the graphic display section 101 displays the image of graphics stored in the graphic storage 104 as an image of graphics to be edited (step S1). Just after this flowchart is started, only the image of graphics stored in the graphic storage 104 is displayed. However, when processing of step S1 is performed after executing steps S2 to S9 or S10 to be described later, the deleting curve generated by the deleting curve generator 107 or the adding curve generated by the adding curve generator 108 is superimposed on the image of graphics stored in the graphic storage 104 and the resultant is displayed.

Next, when the operator operates the mouse 8 (movement, left button is single-clicked or double-clicked) with reference to the graphics displayed by the graphic display section 101, the coordinate input section 102 obtains information relating to the operation (coordinate data of movement destination or information indicating that the left button is single-clicked or double-clicked) (step S2). When new coordinate data is inputted from the coordinate input section 102, the controller 110 controls the coordinate storage 105 to store coordinate data g (px(i), py(i)) therein (step S3).

The controller 110 determines whether or not coordinate data of two points or more is stored in the coordinate storage 105 (step S4). When coordinate data of two points or more is not stored, processing goes to step S9 described later. When coordinate data of two points or more is stored, control is moved to the operation determining section 106. The operation determining section 106 determines whether the curve specified by the operator is one that should be deleted from the editing graphics or one that should be newly added to the graphics based on coordinate data of each point stored in the coordinate storage 105 (step S5).

When it is determined that the curve specified by the operator is one that should be deleted from the editing graphics, control is moved to the deleting curve generator 107. The deleting curve generator 107 generates a deleting curve based on coordinate data of all points stored in the coordinate storage 105 (step S6). On the other hand, when it is determined that the curve specified by the operator is one that should be newly added to the graphics, control is moved to the adding curve generator 108. The adding curve generator 108 generates an adding curve based on coordinate data of all points stored in the coordinate storage 105 (step S7). When the deleting curve or the adding curve is generated, processing goes to step S8.

In step S8, the controller 110 determines whether or not information indicating that the left button of mouse 8 is double-clicked is inputted from the coordinate input section 102 in step S2. When information indicating that the left button is double-clicked is inputted, processing goes to step S11. When information indicating that the left button is double-clicked is not inputted, processing goes to step S9.

In step S9, the controller 110 determines whether or not information indicating that the left button of mouse 8 is single-clicked is inputted from the coordinate input section 102 in step S2. When information indicating that the left button is single-clicked is inputted, processing goes to step S1. When information indicating that the left button is single-clicked is not inputted, the controller 110 deletes coordinate data stored last among coordinate data stored in the coordinate storage 105 (step S10). Then, processing goes to step S1.

In step S11, which is executed when the left button of mouse 8 is double-clicked, control is moved to the graphic corrector 109, and the graphic corrector 109 corrects image data of the graphics stored in the graphic storage 104. More specifically, when the deleting curve is generated in step S6, the graphic corrector 109 updates image data of the graphics stored in the graphic storage 104 to image data of the graphics from which the curve corresponding to the deleting curve is deleted. When the adding curve is generated in step S7, the graphic corrector 109 updates image data of the graphics stored in the graphic storage 104 to image data of the graphics to which the curve corresponding to the adding curve is added. The graphic display section 101 displays image data of the corrected graphics (step S12). Then, processing of this flowchart is ended.

In the case of editing two or more curves, the operator inputs a predetermined instruction using the keyboard 7 or the mouse 8 after ending the edition of one curve, and clears all coordinate data stored in the coordinate storage 105. The operation for clearing coordinate data is carried out by clicking the right button of the mouse 8. After that, processing illustrated in FIG. 3 may be executed to edit a next curve. In the case of canceling the operation without correcting the graphics based on the deleting curve or the adding curve, which is displayed during the edition of graphics, the operator may click the right button of mouse 8.

Figure 4:
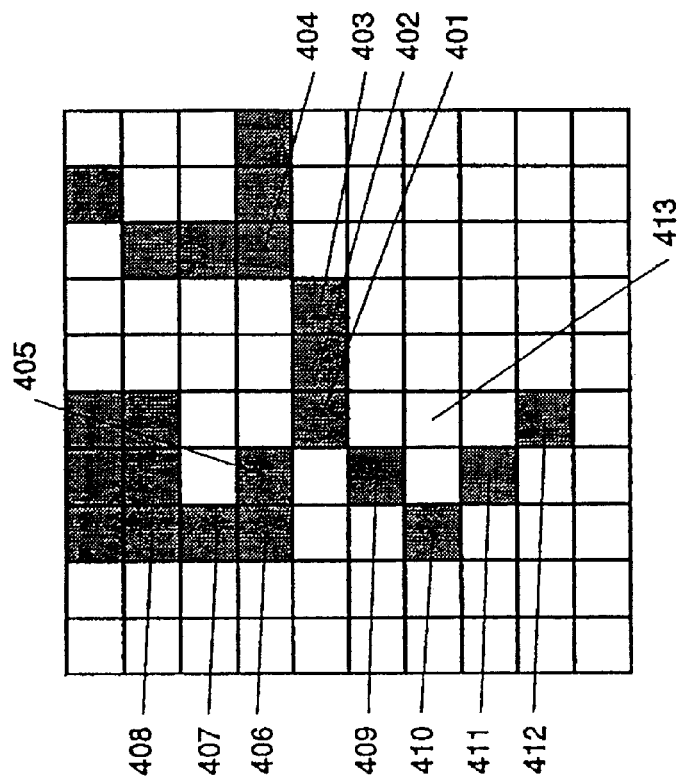
FIG. 4 is a view explaining an example of the operation of the graphic editing apparatus according to the embodiment of the present invention.
Figure 6:
FIG. 6 is a view illustrating core lines extracted from an image of fingerprint.

The following will explain the operation of the graphic editing apparatus of this embodiment based on the specific example. FIG. 4 is a view to explain the operation example of the graphic editing apparatus of this embodiment In FIG. 4, the shaded points indicate points on the curves included in the graphics (points stored as "1" in the coordinate storage 105), and white points indicate points where no curve is formed (points stored as "0" in the coordinate storage 105). For example, points 401 and 404 are intersecting points, a point 412 is an edge point, a point 408 is a non-curve point. A path passing through the points 404, 403, 402, 401, 405, 406, and 407 becomes a traceable curve. In this graphics, it is assumed that the operator wishes to delete a curve passing through points 401, 409, 410, 411, and 412.

First, the graphic display section 101 displays the image of graphics illustrated in FIG. 4 (step S1). At this point in time, neither deleting curve nor adding curve is displayed since processing of step S5 is not performed. Next, when the operator adjusts the mouse cursor to the point 401 and single-clicks the left button of mouse 8, coordinate data of the starting point of curve is inputted from the coordinate input section 102 (step S2). At this point in time, since coordinate data of only one point is stored in the coordinate storage 105 (step S4), processing goes to step S9 and the determination result in step S9 becomes Yes, and processing goes back to step S1.

Though the graphics is displayed again in step S1, coordinate data of only one point is stored in the coordinate storage 105 at this point in time, so that the content of display is unchanged. Next, when the operator operates the mouse 8 to move the mouse cursor to the point 412, coordinate data of a next point is inputted from the coordinate input section 102 (step S2). Since coordinate data of two points are stored in the coordinate storage 105 at this point in time (step S4), processing goes to step S5.

In step S5, the operation determining section 106 determines whether the operation is the deletion of curve or the addition of curve by performing the tracing from the starting point 401 sequentially to determine whether the tracing arrives at the point 412. When the tracing is performed in order of points 401, 402, 403, and 404, the point 404 becomes the intersecting point, so that the tracing is stopped. When the tracing is performed in order of points 401, 406, 407, and 408, the point 408 becomes the non-curve point, so that the tracing is stopped. When the tracing is performed in order of points 401, 409, 410, 411, and 412, the tracing can arrive at the point 412, so that the operation determining section 106 determines it as an addition of curve.

The deleting curve generator 107 generates a deleting curve corresponding to the points 401 to 412 specified by the operator (step S6). When the deleting curve generator 107 checks the staring point 401 and the ending point 412 and finds out that the starting point 401 intersects the other curve, the deleting curve generator 107 excludes it from the object as a deleting curve. The deleting curve generator 107 generates a deleting curve corresponding to the points 409, 410, 411 and 412.

Since the operation of mouse 8 executed in step S2 is neither the double-clicking of left button (step S8) nor the single-clicking of left button (step S9), processing goes to step S10, and the controller 110 deletes coordinate data of point 412 stored last from the coordinate storage 105 (step S10). Thereafter, processing goes back to step S1, and the graphic display section 101 displays the deleting curve, which corresponds to the points 409, 410, 411, and 412, in red to be superimposed on the graphic coordinate illustrated in FIG. 4.

The operator confirms the deleting curve displayed in red and decides whether this deleting curve should be deleted from the graphics. In the case of the deletion, when the operator double-clicks the left button of mouse 8 as adjusting the mouse cursor to the point 412, coordinate data of the ending point of curve is inputted from the coordinate input section 102 (step S2). At this point in time, since coordinate data stored in the coordinate storage 105 is the same as the previous case, the deleting curve corresponding to the points 409, 410, 411 and 412 is generated in step S6.

Since the operation of mouse 8 executed in step 82 is the double-clicking of left button this time (step S8), the graphic corrector 109 corrects data of the graphic stored in the coordinate storage 104 based on the deleting curve generated by the deleting curve generator 107 (step S11). In other words, data of points 409, 410, 411, and 412 stored in the coordinate storage 105 is rewritten from "1" to "0." Then, image data of the corrected graphics is displayed (step S12), and processing is ended.

On the other hand, it is assumed that the operator wishes to add a curve passing through the points 410, 409, 411, and 412 in the above state of the written graphics. In this case, the operator adjusts the mouse cursor to the point 401 to single-click the left button of mouse 8 and adjusts the mouse cursor to the point 410 to single-click the left button of mouse 8. Thereafter, the operator operates the mouse 8 to move the mouse cursor to the point 412. At this point in time, since coordinate data of points 401, 410 and point 412 is stored in the coordinate storage 105 (step S4), processing goes to step S5.

In step S5, though the operation determining section 106 determines whether the operation is the deletion of curve or the addition of curve, there is no path reaching the points 401 to 412 on the graphics. For this reason, the operation is determined as an addition of curve, and the processing goes to step S7. In step S7, the adding curve generator 108 generates an adding curve corresponding to a curve having a path including the points 401, 409, 410, 411, and 412 as a curve passing through at least points 401, 410 and 412.

Since the operation of the mouse executed in step S2 is neither the double-clicking of left button nor the single-clicking of left button, coordinate data of point 412 is deleted from the coordinate storage 105 and processing goes back to step S1. However, the graphic display section 101 displays the adding curve, which is generated by the adding curve generator 108, in green.

The operator confirms the adding curve displayed in green and decides whether this adding curve should be added to the graphics. In the case of the addition, when the operator double-clicks the left button of mouse 8 as adjusting the mouse cursor to the point 412, coordinate data of the ending point of curve is inputted from the coordinate input section 102 (step S2). At this point in time, the adding curve corresponding to the points 401, 409, 410, 411, and 412 is generated in step S7.

Since the operation of mouse 8 executed in step S2 is the double-clicking of left button this time (step S8), the graphic corrector 109 corrects data of the graphic stored in the coordinate storage 105 based on the adding curve generated by the adding curve generator 108 (step S11). In other words, data of points 409, 410, 411, and 412 stored in the coordinate storage 105 is rewritten from "0" to "1." Then, image data of the corrected graphics is displayed (step S12), and processing is ended.

As explained above, according to the graphic editing apparatus of this embodiment, in order to delete the curve from the graphics to be edited, the operator may adjust the mouse cursor to the point on the curve to be desirably deleted and click the left button of mouse 8 (double-click at the ending point). In order to add the curve to the graphics to be edited, the operator may adjust the mouse cursor to the point on the curve to be desirably deleted and click the left button of mouse 8 (double-click at the ending point). Hence, the operator performs only the minimum operations without performing the specified operation of the operation mode, and this makes it possible to add the curve to the graphics or delete the curve from the graphics and to edit the graphics efficiently.

As a case in which the operations more than the minimum operation are required, there is a case in which a straight line, which connects two lines on the traceable curve, must be added. For example, there is a case in which a straight line, which connects points 501 and 502 to each other, is added. Even in this case, the operator may adjust the mouse cursor to, for example, a point 503 as an intermediate point and single-click the left button of mouse 8. This operation is sufficiently simple as compared with the specified operation of the operation, which is provided in the conventional graphic editing apparatus, and obviously has the advantage over the prior art of this invention.

The graphic display section 101 displays the deleting curve generated by the deleting curve generator 107 or the adding curve generated by the adding curve generator 108 to be superimposed on the graphics before data of the graphics is finally corrected. When the mouse 8 is moved, the deleting curve or the adding curve is generated in real time and displayed. Hence, the operator can confirm the shape of graphics before performing the finally defined input (double-click of the left button of mouse 8). In the case where the deleting curve or the adding curve has the shape different from the shape, which the operator intends, it is possible to cancel the operation without correcting the graphics.

Though the graphic display section 101 displays the editing graphics in black, the graphic display section 101 displays the deleting curve in red and the adding curve in green. The operator can obtain three kinds of information including the operation mode showing the addition of curve or the deletion, the shape of the deleting curve, and the shape of the adding curve based on the color and shape of the displayed curve.

In the case where the curve specified by the operator includes the point intersecting the other point, the deleting curve generator 107 has the function of excluding the intersecting point when generating the deleting curve. For this reason, in step S11, the other curve excepting the curve specified by the operator is not divided in the actually corrected graphics.

The graphic editing apparatus of the above embodiment shows no more than one example of the embodiment of the present invention. The present invention includes the following modifications.

Processing of Loop Curve

In the graphic editing apparatus explained in the aforementioned embodiment, in the case where the operator specifies two points on the loop curve that forms the close area without having the point intersecting the other curve, two curves, which can trance from the starting point to the ending point, exist. In this case, the deleting curve generator 107 can generate a deleting curve corresponding to the entirety of the corresponding loop curve. The deleting curve generator 107 instructs the operator to specify one more adding point on the loop curve. When the adding point is instructed, the deleting curve generator 107 can generate the deleting curve based on coordinate data of the starting point, ending point and adding point.

The deleting curve generator 107 can generate a deleting curve corresponding to the shorter curve of the two traceable curves. At the time of calculating the length of the traceable curve, the deleting curve generator 107 adds "1" when the tracing is performed in a vertical or horizontal direction from the notice point, and "1.4 (approximate value of the square root of 2) when the tracing is performed in a slanting direction. This makes it possible to calculate the length of curve easily. In two traceable curves, when one that the operator desires to delete does not become the deleting curve, the deletion of curve may be performed two times after the canceling operation is once carried out. The graphic editing apparatus having such deleting curve generator 107 can delete the part of the loop curve by the same operation as the case in which the other curve is deleted to make it possible to edit the graphics more efficiently.

Processing of Non-Curve Point

When the operator adds the curve adjacent to the curve included in the editing graphics, a non-curve point, which is not traceable, occurs in some instances. For example, in the case where a straight line reaching a point 518 of FIG. 5 from a point 511 thereof is added, points 515 and 516 becomes non-curve points. In the aforementioned graphic editing apparatus, processing for eliminating such non-curve points becomes troublesome.

In order to eliminate the non-curve point easily, the operation determining section 106 and deleting curve generator 107 can be modified as follows:

More specifically, the operation determining section 106 continues to trace even if the notice point becomes a non-curve point. In connection with a curve that is formed by tracing from the starting point specified by the operator to the ending point, if all points on the curve become non-curve points, the operation determining section 106 determines the traced curve as one to be deleted. The deleting curve generator 107 generates a deleting curve corresponding to the curve whose points are all non-curve points, and the graphic corrector 109 deletes the curve corresponding to the deleting curve from the editing graphics. The graphic editing apparatus having the operation determining section 106 and deleting curve generator 107 thus modified can delete the non-curve points in accordance with the same procedure as that of the normal curve deletion so as to make it possible to edit the graphics more efficiently.

In order to eliminate the non-curve point easily, the graphic corrector 109 can be also modified as follows:

More specifically, in the case where the curves are added to the editing graphics based on the adding curve, the graphic corrector 109 can perform processing for thinning each curve included in the corresponding graphics. This thinning-line processing can adopt the image processing method, which is conventionally known. The graphic editing apparatus to which this thinning-line processing is added can automatically eliminate the non-curve points generated in the editing graphics due to the addition of curves so as to make it possible to edit the graphics more efficiently.

Processing of Short Loop Curve

When the operator adds the curve adjacent to the curve included in the editing graphics, a short loop curve occurs in some instances. For example, in the case where a straight line reaching the point 518 of FIG. 5 from the point 511 thereof is added, a loop curve having a path including points 516, 517, 518, 519, 520, 523, and 516 occurs. In the aforementioned graphic editing apparatus, processing for eliminating such a short loop curve becomes troublesome.

In order to eliminate the short loop curve, the adding curve generator 108 can be modified as follows:

More specifically, the adding curve generator 108 generates an adding curve in the same way as that of the aforementioned embodiment first. The adding curve generator 108 divides the generated curve at a portion contacting the curve, which is already included in the editing graphics. The adding curve generator 108 excludes a point included in a segment having a length, which is less than a fixed value among the divided segments, from the adding curve finally generated. Additionally, in connection with the curve, which has the segment between the staring point and the ending point is less than the fixed value, such a division of segment is not carried out and there is no point, which is excluded from the adding curve.

Figure 5:
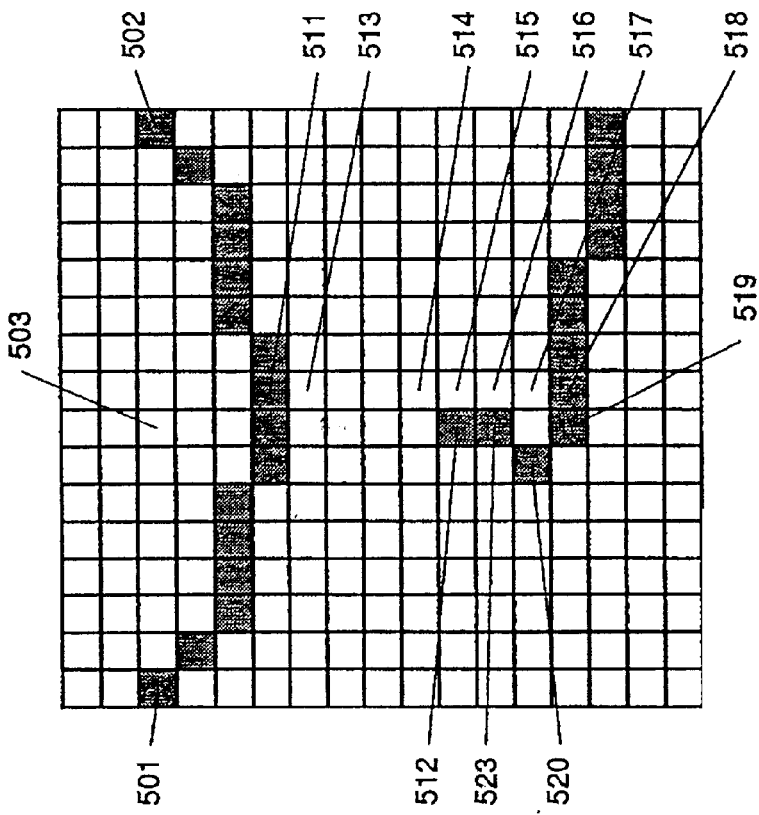
FIG. 5 is a view illustrating an image pattern to explain a modification of the embodiment of the present invention.

This can be explained more specifically using the example of FIG. 5. The straight line, which is from the point 513 to the point 518, is divided into four segments including points 513 to 514, point 515, point 516, and point 517, at the point 514. Since each segment of points 513, 516, and 517 has a length of 1, they are excluded from the adding curve. As a result, the adding curve becomes a straight line including the segment from the point 513 to the point 514. Even if the graphic corrector 109 adds the curve, which corresponds to this adding curve, to the editing graphics, no short loop curve occurs on the editing graphics. The graphic editing apparatus having the adding curve generator thus modified can prevent the short loop curve from being generated by the addition of curve so as to make it possible to edit the graphics more efficiently.

Processing of Coordinate Data

Figure 9:
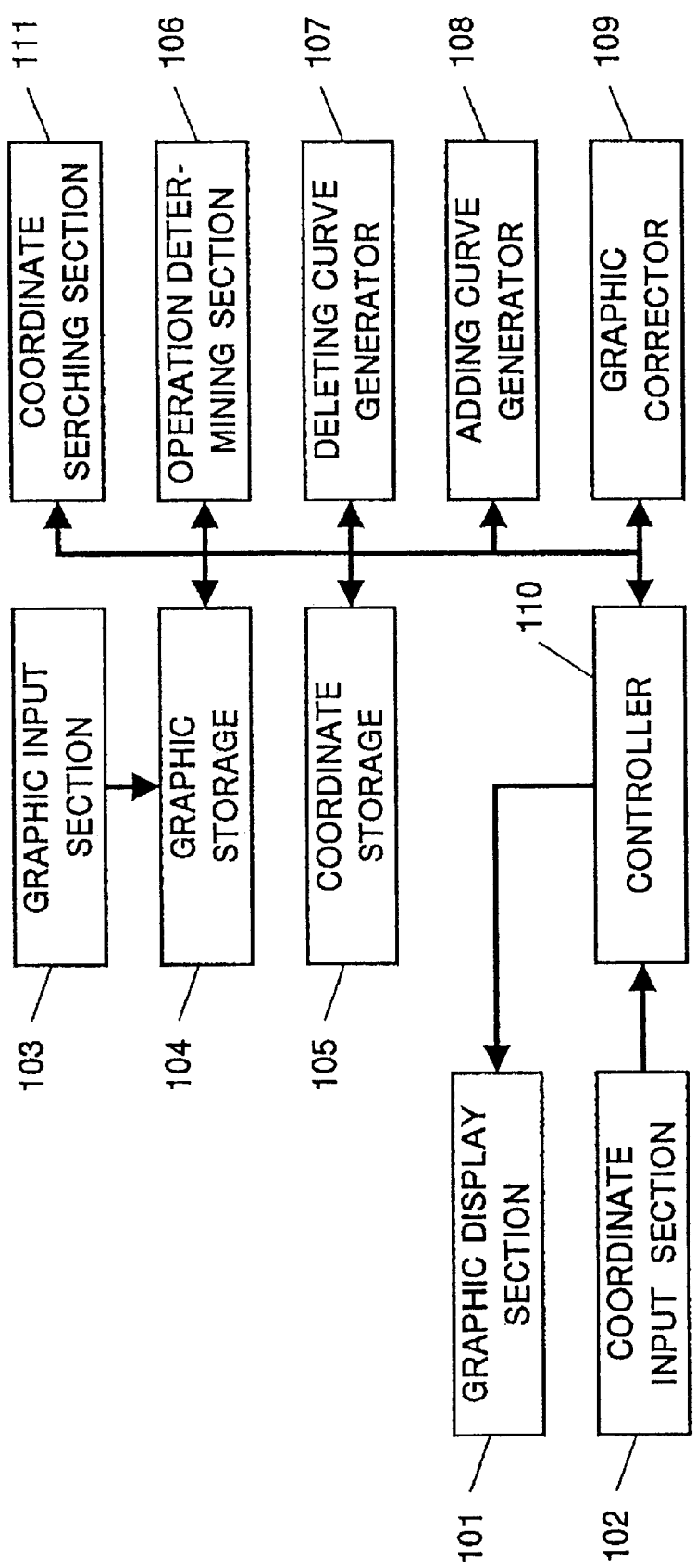
FIG. 9 is a function block diagram of the graphic editing apparatus of the modification.

According to the graphic editing apparatus of the aforementioned embodiment, the operator must adjust the mouse cursor to the point on the corresponding curve accurately and click the left button to input coordinate data when desiring to delete the curve included in the graphics. However, it is a relatively difficult operation to adjust the mouse cursor accurately. FIG. 9 is a function block diagram of the graphic editing apparatus of a modification, which is applied to solve this problem. As illustrated in this figure, the graphic editing apparatus of this modification further comprises a coordinate searching section 111 in addition to the graphic editing apparatus illustrated in FIG. 2.

Figure 10:
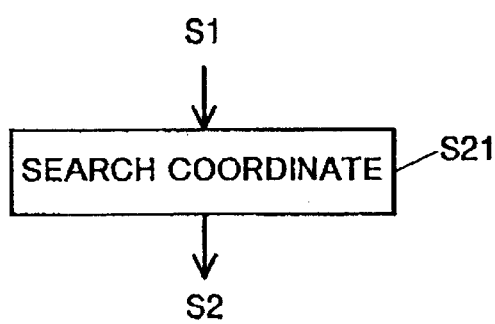
FIG. 10 is a view illustrating a step to be adder to the flowchart of FIG. 3 in the graphic editing apparatus of the modification.
Figure 8:
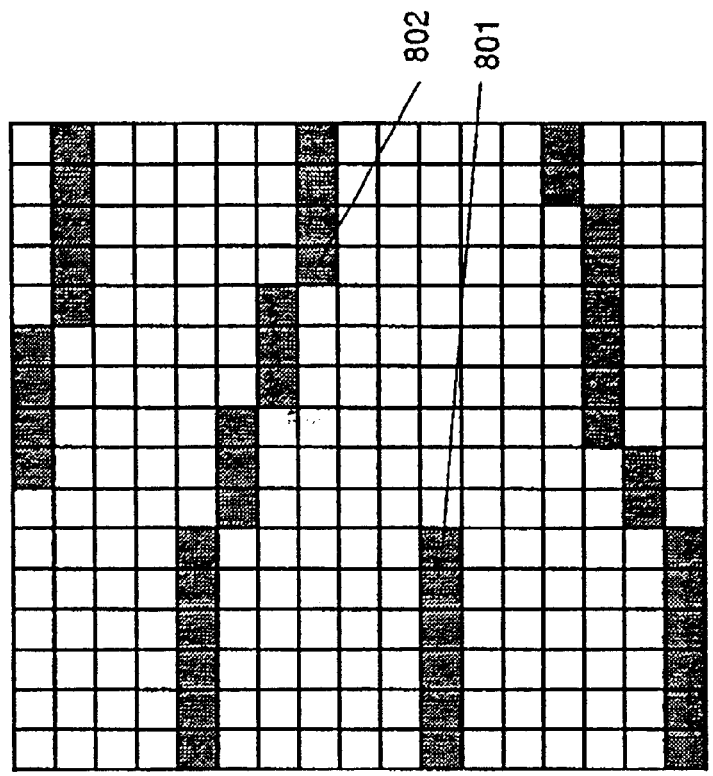
FIG. 8 is a view illustrating an image pattern to explain prior art.
Figure 7:
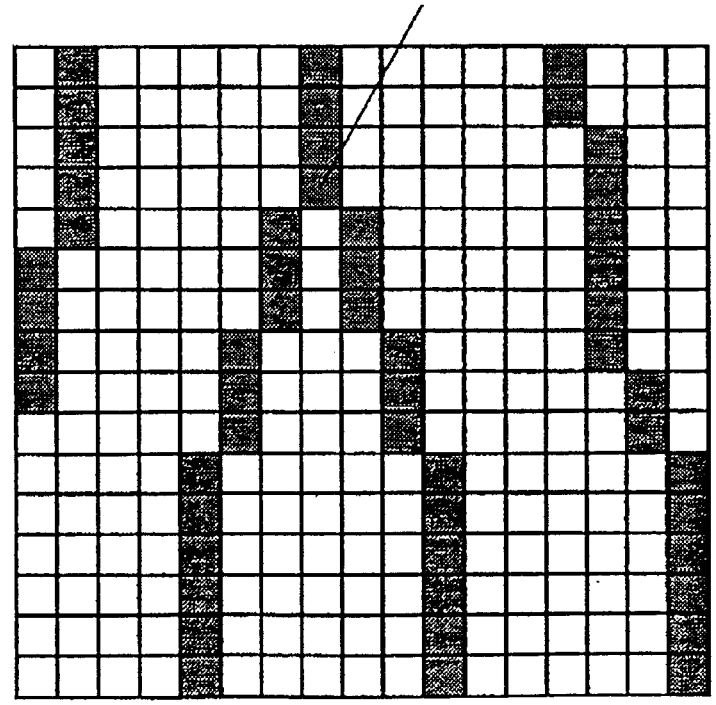
FIG. 7 is a view illustrating an image pattern to explain prior art.

The coordinate searching section 111 is implemented when CPU 1 executes a coordinate search routine of the graphic editing program. The coordinate searching section 111 searches a point on a curve closest to the point inputted from the coordinate input section 102, and stores coordinate data of the searched point to the coordinate storage 105. A point searching range by the coordinate searching section 111 is set to a given threshold value. This processing is executed as processing of step S21 between steps S2 and S3 of the flowchart of FIG. 3 as illustrated in FIG. 10.

The graphic editing apparatus of this modification saves the operator from having to specify the point on the curve to be deleted correctly so as to make it possible to edit the graphics more efficiently. According to the graphic editing apparatus of this modification, when the operator specifies the starting point (first coordinate data is stored in the coordinate storage 105), the coordinate searching section 111 first searches only the edge point and the intersecting point in the searching range. Then, when neither edge point nor intersecting point can be found out, the coordinate searching section 111 may search points on the curve other than the edge point and the intersecting point. This makes it possible to easily delete the curve between the edge points and/or between the intersecting points, which the operator frequently specifies as a curve to be deleted, from the editing graphics. In order to eliminate such a short loop curve, other processing may be adopted.

In even this graphic editing apparatus of this modification, the deleting curve generator 107 has a function of excluding the intersecting point from the deleting curve, making it possible to prevent the division of the other curves other than the curve specified by the operation. The coordinate searching section 111 of this graphic editing apparatus of this modification can be configured to search coordinate data in such a way that coordinate data of the starting point and that of the ending point do not conform to each other. In the case where the operation determining section 106 determines the operation as an addition of curve, the adding curve generator 108 can generate an adding curve in accordance with not coordinate data of the point searched by the coordinate searching section 111 but coordinate data of the point where the mouse cursor is actually positioned.

Other Modifications

In the aforementioned embodiment, the editing graphics, the deleting curve and the adding curve are displayed in black, red, and green respectively, on the graphic display section 101 (display device 6). However, the present invention is not limited to this. If the respective display modes are made different from one another, these display methods are arbitrarily performed. For example, display can be performed using at least 4-level gray scale wherein the gray scale of the background image is 1, that of the editing graphics is 3, that of the deleting curve is 2, and that of the adding curve is 1. Moreover, the deleting curve can be displayed by dotted lines, and the adding curve can be displayed by broken lines.

The graphic display section 101 can display the edge point, the intersecting point, and the non curve point in different colors, respectively (the adding curve and the deleting curve are display in a different color) instead of displaying the whole editing graphics in black. The graphic display section 101 may grid display when performing the graphics. This makes it possible for the operator to easily recognize the positions of the edge point of curve, intersecting point, and non-curve point so as to edit the graphics more easily.

Coordinate data may be stored in the coordinate storage 105 only when the left button of mouse 8 is single-clicked or double-clicked. The click of right button is made to correspond to the above single-click and the click of left button is made to correspond to the above double-click so that processing may be carried out. The canceling operation may be performed using the operation mode specify button. The input of coordinate data may be carried out by the pointing devices other than the mouse 8 (e.g., track ball, digitizer, light pen, and the like). Moreover, x-coordinate and y-coordinate may be inputted with numeric numbers from the keyboard.

The trace range of curve by the operation determining section 106 can be shortened or extended as compared with the case of the above embodiment. For example, even if the intersecting point is found out during the trace of curve, it is possible to trace a plurality of curves from the intersecting point onward without ending the trace at the intersecting point. This makes it possible to delete the curve intersecting the other curve by a series of operations. The deleting curve generator 107 can exclude the intersecting point, which is found out in the middle of the tracing of this curve, from the deleting curve. The operation determining section 106 may trace the curve from the corresponding starting point only when the left button of mouse 8 is first single-clicked to decide the starting point, and store all points, which are traceable from the starting point. In this case, the operation determining section 106 can determine the operation as a deletion of curve if the point of the moving destination is stored as-a traceable point, and determine the operation as an addition of curve if the point of the moving destination is not stored.

The graphic editing apparatus explained in the above embodiment has adopted only the graphic editing method in which the operator operates the mouse 8 to input coordinate data so as to delete or add the curve. However, the graphic editing apparatus of the present invention may use the method in which the above method is combined with the other method. The following methods can be used as a combinable method. For example, there is a method in which the mouse 8 is dragged to specify the starting point and ending point of the curve, and a method in which the mouse is operated as pressing a specific key of the keyboard to specify the range, whereby performing a rectangular deletion and the deletion of all traceable curves. In the case where the adding curve generator 108 generates the adding curve, polynomial interpolation can be used.

The computer system that serves as a platform of the graphic editing apparatus of the aforementioned embodiment is a stand-alone single processor system. However, the present invention can apply the computer system of other embodiment as a platform. For example, a distributed system, which is composed of a host computer and a terminal apparatus, may be used as a platform. In this case, the terminal apparatus side performs the display of graphics (and deleting curves or adding curves) and the input of coordinate data, and the host computer side can perform other processing. The computer system that serves as a platform may be a multi-processor system. The above-mentioned graphic editing apparatus may be implemented by not the general-purpose but a special-purpose computer.

Though the processing program of the graphic editing apparatus explained in the above embodiment is prestored in the memory, the processing program may be provided separately from hardware. For example, the program illustrated in the flowchart of FIG. 3 (and FIG. 10) may be stored in a computer-readable recording medium such as a CD-ROM, a DVD-ROM, and the like to be distributed. Moreover, a data signal corresponding to the program is superimposed on a carrier wave, so that the resultant may be downloaded to the general-purpose computer from a Web server over the Internet.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-266127 filed on Sep. 1, 2000 and including specification, claims, drawings and summary. The disclosure of the above Japanese Patent Application is incorporated herein by reference in its entirety.

What is claimed is:

1. A graphic editing apparatus comprising:
   a program memory for storing a program;
   a data memory for storing data;
   a display device for displaying an image;
   a coordinate input device for inputting two-dimensional coordinate data; and
   a processor, which is connected to said program memory, said data memory, said display device and said coordinate input device, for executing a predetermined calculation in accordance with the program stored in said program memory and for controlling said data memory, said display device and said coordinate input device, wherein said graphic editing apparatus edits a two-dimensional graphics including at least one curve in accordance with an operator's operation of said coordinate input device,
   said data memory including:
      an area where two-dimensional data of the graphics to be edited is stored; and
      an area where coordinate data inputted from said coordinate input device is stored,
   said program including:
      a graphic storing step of storing data of said graphics in said data memory;
      a graphic displaying step of displaying an image of the graphics stored in said data memory on said display device;
      a coordinate inputting step of inputting, from said coordinate input device, coordinate data of a plurality of points in a two-dimensional space where said graphics exists in accordance with said displayed graphics to be edited;
      a coordinate storing step of storing said inputted coordinate data of the plurality of points in said data memory;
      an addition/deletion determining step of determining whether a new curve should be added to said graphics or a curve included in said graphic should be deleted based on said coordinate data of the plurality of points and data of the graphics stored in said data memory by determining whether there is a curve which is traceable from the starting point to the ending point; and
      a graphic editing step of performing either processing for adding a new curve to two-dimensional data of the graphics stored in said data memory or processing for deleting a curve from two-dimensional data of said graphics based on a determination result in said addition/deletion determining step.

2. The graphic editing apparatus according to claim 1, wherein said coordinate input device can input coordinate data by an arbitrary method among a plurality of kinds of input methods, and
   said program further includes a input determining step of determining whether the input method of coordinate data in said coordinate inputting step is a specific method indicating that no coordinate data of other points is to be inputted, and
   said graphic editing step corrects two-dimensional data of the graphics stored in said data memory to two-dimensional data of the graphics where the curve is added or deleted when the input method is determined as the specific method in said input determining step.

3. The graphic editing apparatus according to claim 2, wherein said addition/deletion determining step determines whether a new curve should be added to said graphics or a curve included in said graphics should be deleted, every time when coordinate data is inputted in said coordinate inputting step, and
   said graphic editing step includes:
      a curve adding step of generating an adding curve corresponding to coordinate data of the plurality of points stored in said data memory when it is determined that the input method is not the specific method in said input determining step and it is determined that the new curve should be added in said addition/deletion determining step;
      a curve deleting step of generating a deleting curve corresponding to coordinate data of the plurality of points stored in said data memory when it is determined that the input method is not the specific method in said input determining step and it is determined that the curve should be deleted in said addition/deletion determining step; and
      a graphic correcting step of correcting two-dimensional data of the graphics stored in said data memory to two-dimensional data where the curve is added or deleted based on said addition curve or said deleting curve when it is determined that the input method is the specific method in said input determining step, and
   said graphic displaying step superimposes said adding curve or said deleting curve on the image of said graphics and displays the resultant on said display device.

4. The graphic editing apparatus according to claim 3, wherein said image of graphics, said adding curve and said deleting curve are displayed on said display device in modes different from one another.

5. The graphic editing apparatus according to claim 1, wherein when a plurality of curves being traceable from the starting point to the ending point of coordinate data stored in said data memory is included in said graphics, said addition/deletion determining step determines the shortest curve of all as a curve to be deleted.

6. The graphic editing apparatus according to claim 1, wherein, said program further includes a step of determining whether a point intersecting other curve is included in said deleting curve when it is determined that the curve should be deleted in said addition/deletion determining step, and
   said graphic editing step performs processing for deleting a curve from said two-dimensional data of said graphics after excluding the intersecting point from a deleting object.

7. The graphic editing apparatus according to claim 1, wherein when there is a curve, which is traceable in accordance with coordinate data stored in said data memory and which has only non-curve points, included in said graphics, said addition/deletion determining step determines a deletion of said curve having only non-curve points, and said graphic editing step performs processing for deleting the curve having only said non-curve points.

8. The graphic editing apparatus according to claim 1, wherein said graphic editing step further includes the step of thinning each curve included in the graphics subjected to said curve addition when processing for adding the curve is performed.

9. The graphic editing apparatus according to claim 1, wherein when the curve that should be added in accordance with coordinate data stored in said data memory and the curve already included in said graphics form a loop curve with a length being less than a predetermined length, said graphic editing step performs processing for excluding said loop curve to add the curve to two-dimensional data of said graphics.

10. The graphic editing apparatus according to claim 1, wherein said program further includes a coordinate searching step of searching coordinate data of points on the curve included in said graphics close to coordinate data of points inputted in said coordinate inputting step, and said coordinate storing step stores coordinate data of points searched in said coordinate searching step in said data memory in place of coordinate data of points inputted in said coordinate inputting step.

11. The graphic editing apparatus according to claim 1, wherein said adding curve and said deleting curve are displayed in real time in colors different from each other before addition of curve and deletion of curve are performed.

12. A graphic editing apparatus for editing a two-dimensional graphics including at least one curve in accordance with an operation done by an operator, said graphic editing apparatus comprising:

graphic storing means for storing two-dimensional data of said graphics to be edited;

graphic displaying means for displaying an image of the graphics stored in said graphic storing means;

coordinate inputting means for inputting coordinate data of a plurality of points in a two-dimensional space where said graphics exists in accordance with the image displayed by said graphic displaying means;

coordinate storing means for storing coordinate data of the plurality of points inputted by said coordinate inputting means;

addition/deletion determining means for determining whether a new curve should be added to said graphics or a curve included in said graphics should be deleted based on coordinate data of the plurality of points stored in said coordinate storing means and data of the graphics stored in said graphic storing means by determining whether there is a curve which is traceable from the starting point to the ending point;

graphic editing means for performing either processing for adding a new curve to two-dimensional data of the graphics stored in said data memory or processing for deleting a curve from two-dimensional data of said graphics based on the determination result of said addition/deletion determining means.

13. The graphic editing apparatus according to claim 12, wherein said coordinate inputting means can perform either an undefined input indicating that coordinate data of other points is to be inputted or a defined input indicating that no coordinate data of other points is to be inputted, and said graphic editing means corrects two-dimensional data of the graphics stored in said graphic storing means to two-dimensional data of the graphics where the curve is added or deleted when the defined input is sent from said coordinate inputting means.

14. The graphic editing apparatus according to claim 13, wherein said addition/deletion determining means determines whether a new curve should be added to said graphics or a curve included in said graphics should be deleted every time when coordinate data is inputted from said coordinate inputting means, and said graphic editing means includes:

adding curve generating means for generating an adding curve corresponding to coordinate data of the plurality of points stored in said coordinate storing means when the defined input is sent from said coordinate inputting means and said addition/deletion determining means determines that a new curve should be added;

deleting curve generating means for generating a deleting curve corresponding to coordinate data of the plurality of points stored in said coordinate storing means when the undefined input is sent from said coordinate inputting means and said addition/deletion determining means determines that the curve should be deleted; and graphic correcting means for correcting two-dimensional data of the graphics stored in said graphic storing means to two-dimensional data where the curve is added or deleted based on said addition curve or said deleting curve when the defined input is sent from said coordinate inputting means.

15. The graphic editing apparatus according to claim 12, further comprising coordinate searching means for searching coordinate data of points on the curve included in said graphics close to coordinate data of points inputted from said coordinate inputting means, wherein said coordinate storing means stores coordinate data of points searched by said coordinate searching means in place of coordinate data of points inputted from said coordinate inputting means.

16. A graphic editing method for editing a two-dimensional graphics including at least one curve in accordance with an operation done by an operator, said graphic editing method comprising:

inputting coordinate data of a plurality of points in a two-dimensional space where said graphics exists;

determining whether a new curve should be added to said graphics or a curve included in said graphics should be deleted with reference to the position of said inputted coordinate data of the plurality of points on said graphics by determining whether there is a curve which is traceable from the starting point to the ending point; and performing either processing for adding a new curve to said graphics or processing for deleting a curve therefrom based on said determination result.

17. A computer-readable recording medium having a program for editing a two-dimensional graphics including at least one curve in accordance with an operation done by an operator recorded thereon, said program causing a computer to execute steps of:

storing two-dimensional data of said graphics to be edited in a memory;

displaying an image of the graphics stored in said memory on a display device;

inputting coordinate data of a plurality of points in a two-dimensional space where said graphics exists from an input device in accordance with the displayed image of graphics to be edited;

determining whether a new curve should be added to said graphics or a curve included in said graphics should be deleted based on coordinate data of the plurality of points and data of the graphics stored in said memory by determining whether there is a curve which is traceable from the stalling point to the ending point;

performing either processing for adding a new curve to two-dimensional data of the graphics stored in said memory or processing for deleting a curve from two-dimensional data of said graphics based on a determination result of said determining step.

18. A carrier wave having a data signal of a program for editing a two-dimensional graphics including at least one curve in accordance with an operation done by an operator superimposed thereon, said program causing a computer that receives said carrier wave to execute steps of:

storing two-dimensional data of said graphics to be edited in a memory;

displaying an image of the graphics stored in said memory on a display device;

inputting coordinate data of a plurality of points in a two-dimensional space where said graphics exists from an input device in accordance with the displayed image of graphics to be edited;

determining whether a new curve should be added to said graphics or a curve included in said graphics should be deleted based on coordinate data of the plurality of points and data of the graphics stored in said memory by determining whether there is a curve which is traceable from the starting point to the ending point;

performing either processing for adding a new curve to two-dimensional data of the graphics stored in said memory or processing for deleting a curve from two-dimensional data of said graphics based on a determination result of said determining step.

19. A graphic editing apparatus comprising:

a program memory for storing a program;

a data memory for storing data;

a display device for displaying an image;

a coordinate input device for inputting two-dimensional coordinate data; and a processor, which is connected to said program memory, said data memory, said display device and said coordinate input device, for executing a predetermined calculation in accordance with the program stored in said program memory and for controlling said data memory, said display device and said coordinate input device, wherein said graphic editing apparatus edits a two-dimensional graphics including at least one curve in accordance with an operator's operation of said coordinate input device, said data memory including:

an area where two-dimensional data of the graphics to be edited is stored; and an area where coordinate data inputted from said coordinate input device is stored, said program including:

a graphic storing step of storing data of said graphics in said data memory;

a graphic displaying step of displaying an image of the graphics stored in said data memory on said display device;

a coordinate inputting step of inputting, from said coordinate input device, coordinate data of a plurality of points in a two-dimensional space where said graphics exists in accordance with said displayed graphics to be edited;

a coordinate storing step of storing said inputted coordinate data of the plurality of points in said data memory;

an addition/deletion determining step of determining whether a new curve should be added to said graphics or a curve included in said graphic should be deleted based on said coordinate data of the plurality of points and data of the graphics stored in said data memory; and a graphic editing step of performing either processing for adding a new curve to two-dimensional data of the graphics stored in said data memory or processing for deleting a curve from two-dimensional data of said graphics based on a determination result in said addition/deletion determining step, wherein said adding curve and said deleting curve are displayed in real time in colors different from each other before addition of curve and deletion of curve are performed.

* * * * *